US008674986B2

United States Patent
Bin Zafar et al.

(10) Patent No.: US 8,674,986 B2
(45) Date of Patent: Mar. 18, 2014

(54) METHOD AND SYSTEM FOR SCATTERED SPHERICAL HARMONIC APPROXIMATION

(75) Inventors: Nafees Bin Zafar, Venice, CA (US); Doug Roble, Culver City, CA (US)

(73) Assignee: Digital Domain Products, Inc., Venice, CA (US)

( * ) Notice: Subject to any disclaimer, the term of this patent is extended or adjusted under 35 U.S.C. 154(b) by 976 days.

(21) Appl. No.: 12/177,098

(22) Filed: Jul. 21, 2008

(65) Prior Publication Data
US 2009/0027390 A1 Jan. 29, 2009

Related U.S. Application Data

(60) Provisional application No. 60/962,120, filed on Jul. 25, 2007.

(51) Int. Cl.
G06T 15/50 (2011.01)
(52) U.S. Cl.
USPC .......................................................... 345/426
(58) Field of Classification Search
None
See application file for complete search history.

(56) References Cited

U.S. PATENT DOCUMENTS

| 7,212,207 | B2 | 5/2007 | Green et al. | |
|---|---|---|---|---|
| 7,663,623 | B2* | 2/2010 | Zhou et al. | 345/426 |
| 2005/0035965 | A1* | 2/2005 | Sloan et al. | 345/426 |
| 2005/0080602 | A1* | 4/2005 | Snyder et al. | 703/2 |
| 2005/0104883 | A1 | 5/2005 | Snyder et al. | |
| 2006/0028468 | A1* | 2/2006 | Chen et al. | 345/424 |
| 2006/0214931 | A1 | 9/2006 | Snyder et al. | |
| 2006/0279570 | A1* | 12/2006 | Zhou et al. | 345/426 |
| 2007/0018996 | A1 | 1/2007 | Wang et al. | |
| 2007/0229502 | A1* | 10/2007 | Tong et al. | 345/426 |
| 2008/0018647 | A1* | 1/2008 | Bunnell | 345/426 |

OTHER PUBLICATIONS

Kristensen et al., Precomputed Local Radiance Transfer for Real-Time lighting Design, Jul. 2005, ACM SIGGRAPH 2005, ACM Transactions on Graphics, vol. 24, Issue 3, pp. 1208-1215.*
Arikan, et al. "Fast and Detailed Approximate Global Illumination by Irradiance Decomposition" ACM SIGGRAPH, 2005 pp. 1108-1114.
Chris Oat, "Adding Spherical Harmonic Lighting to the Sushi Engine" 3D Application Research Group ATI Research, Inc., Game Developers Conference pp. 1-59.
Sloan, et al. "Precomputed Radiance Transfer for Real-Time Rendering in Dynamic, Low-Frequency Lighting Environments", in SIGGRAPH 2002, Computer Graphics Proceedings, pp. 527-536.

* cited by examiner

*Primary Examiner* — Edward Martello
(74) *Attorney, Agent, or Firm* — Perkins Coie, LLP (57) ABSTRACT

A scattered spherical harmonic (SH) approximation method is proposed for pre-computation of SH coefficients at sampling vertices of an object to be rendered. The approach sparsely populates the object with a plurality of SH sampling vertices and uses the least squares approximation to calculate the SH coefficients at any (other) arbitrary point of the object by extrapolating from the computed SH coefficients at the SH sampling vertices.

24 Claims, 5 Drawing Sheets

METHOD AND SYSTEM FOR SCATTERED SPHERICAL HARMONIC APPROXIMATION

RELATED APPLICATIONS

This application claims priority to U.S. Provisional Patent Application No. 60/962,120, filed Jul. 25, 2007, and entitled "Method and system for scattered spherical harmonic approximation," by Nafees Zafar et al., and is hereby incorporated herein by reference.

BACKGROUND

1. Field of Invention

This invention relates to the field of object illumination rendering.

2. Background of the Invention

The realism of rendered graphics of an object often depends on the accuracy of the illumination effects associated with the object that is being modeled. These illumination effects typically require intensive processing, especially for real-time graphics rendering. Many of the available rendering methods, however, do not effectively account for illumination effects. For a non-limiting example, some low-order methods for calculating the illumination effects only use a limited number of lighting coefficients and thus are limited to low-frequency lighting and produce only soft shadows for the rendered object.

Recent computer graphics research has explored the use of spherical harmonics (SH) for global illumination to generate realistic real-time rendering of 3D scenes of an object, taking into account subtle effects through different types of diffuse lighting models, which include but are not limited to, un-shadowed, shadowed, and inter-reflected. The goal is to render the global illumination of the object lit by any type of light sources. The lighting environment and the local visibility of the object can be independently pre-computed as SH coefficients thus permitting near-instantaneous relighting of objects. However, the pre-computation of the SH coefficients is often quite expensive in terms of computing resources consumed.

SUMMARY OF INVENTION

A scattered spherical harmonic (SH) approximation method is proposed for pre-computation of SH coefficients at sampling vertices of an object to be rendered. The approach sparsely populates the object with a plurality of SH sampling vertices and uses the least squares approximation to calculate the SH coefficients at any (other) arbitrary point of the object by extrapolating from the computed SH coefficients at the SH sampling vertices.

DETAILED DESCRIPTION OF EMBODIMENTS OF THE INVENTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Spherical Harmonics and its Coefficients

Spherical harmonics (SH) are basis functions defined over the surface of a unit sphere that can be used to reconstruct any two-dimensional functions. Spherical harmonics provide ways to compress the amount of incoming lights through a hemisphere dramatically so that such data on lights can be easily stored for each point on an object, while supporting very fast computations. The term "basis function" comes from the fact that this type of function can be scaled and combined to approximate any mathematical function. The scaling factors used to combine the basis functions are usually referred to as coefficients. For a non-limiting example, a function $f(x)$ can be approximated by the family of basis functions $B_i(x)$, and the coefficients $c_i$ can be calculated through integration of these basis functions $B_i(x)$ with the function $f(x)$ over $f(x)$'s domain, as shown by the equations below.

$$f(x) = \lim_{n \to \infty} \sum_{i=0}^{n} c_i B_i(x)$$

where $$c_i = \int_D f(x) B_i(x) dx$$

Figure 1:
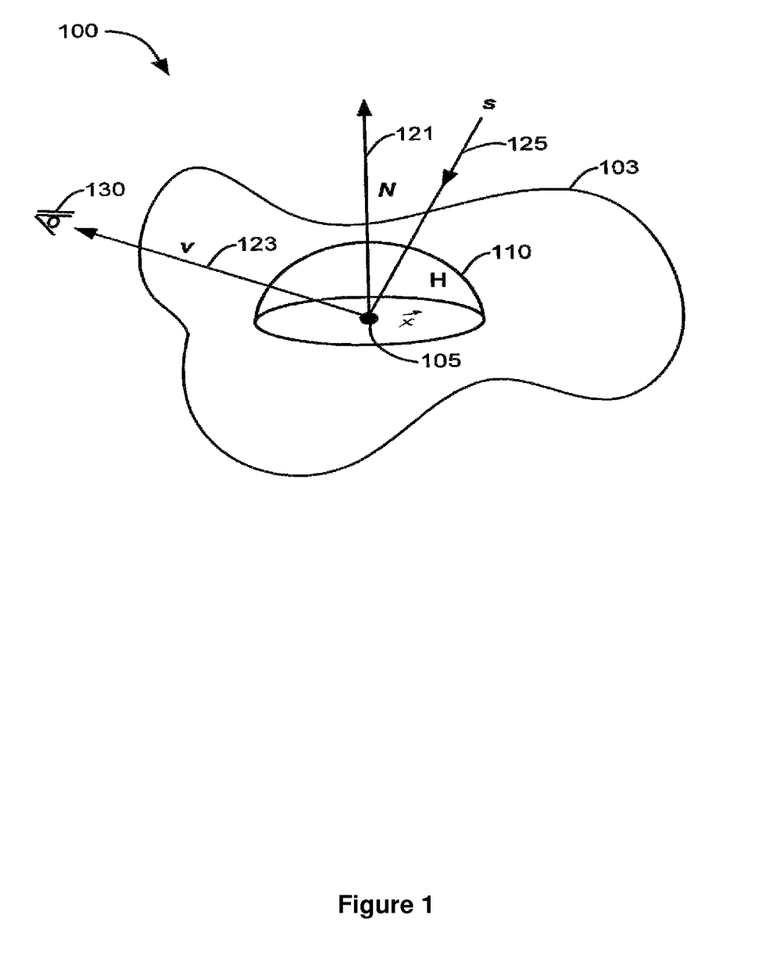
FIG. 1 is an illustration of an exemplary convention for representing illumination effects at a vertex of an object.

FIG. 1 shows an exemplary convention 100 for representing illumination effects. As illustrated in FIG. 1, illumination effects for object 103 at a surface point 105 (also shown as vertex $\vec{x}$) may be represented in conjunction with a unit sphere 110. The base surface of hemisphere (unit sphere) 110 (also shown as H) is situated on the surface of object 103 at point 105, represented by normal vector 121. Source radiance 125 (also shown as vector $\vec{x}$) passes through the unit sphere 110 and reflects off object 103 at surface point 105. Viewing the reflected radiance in a particular viewing position 130, the exit radiance 123 is represented by vector v.

For a two-dimensional function $f(s)$ defined over the unit sphere 110, the coefficients $c_i$ become $c_l^m$, the spherical harmonics coefficients, and the basis function $B_i$ becomes $y_l^m(s)$, the spherical harmonics. The nth order approximated function of $f$, called $\tilde{f}$, can then be reconstructed by:

$$\tilde{f}(s) = \sum_{l=0}^{n} \sum_{m=-l}^{l} c_l^m y_l^m(s)$$

Where the $c_l^m$ coefficients are given by:

$$c_l^m = \int_s f(s) y_l^m(s) ds$$

Here, the $\theta$ function is a band-limited approximation of the original function $f$, which in turn can be fully reconstructed by:

$$f(s) = \sum_{i=0}^{\infty} c_i y_i(s)$$

Since spherical coordinates over the unit sphere of domain s are defined by $$\begin{cases} x = \sin\theta\cos\varphi \\ y = \sin\theta\sin\varphi \\ z = \cos\varphi. \end{cases}$$

the $c_i$ coefficients can be calculated by:

$$c_i = \int_0^{2\pi} \int_0^{\pi} f(\theta,\phi) y_i(\theta,\phi) \sin\theta d\theta d\phi$$

The use of more coefficients to represent the source lighting when rendering an object enables handling of high frequency lighting that does not limit the source to only low frequency lighting. For a non-limiting example, the approach described above is capable of handling lighting that is represented by more than 1000 basis functions (i.e. high frequency lighting).

In some embodiments, Monte Carlo integration can be applied to the integration of any function, wherein Monte Carlo integration can numerically resolve any integral without actually resolving the equation itself. Monte Carlo integration is based on stochastic sampling, meaning that the unit sphere needs to be divided into a regular grid of n×n cells so that a number of samples evenly distributed on the unit sphere can be taken at a random point inside each cell.

Once a sampling scheme is chosen, the integral in the equation above can be resolved numerically. The important thing to Monte Carlo integration is the Monte Carlo estimator, which allows estimating the integral of any function $f$ by summing the product of the value of that function at sample points by the value of the probability density function (PDF), p, at the same sample points:

$$E[f(x)] = \int f(x)dx = \int \frac{f(x)}{p(x)} p(x)dx \approx \frac{1}{N} \sum_{i=1}^{N} \frac{f(x_i)}{p(x_i)}$$

If the distribution of the sample points is uniform over the set of integration, the inverse of the PDF (also known as the weighting function) can be taken out and the approximation of the integral of the function is just the product of the function evaluated at these sample points, divided by a weight.

$$\int f(x)dx \approx \frac{1}{N} \sum_{i=1}^{N} \frac{f(x_i)}{p(x_i)} \approx \frac{1}{N} \sum_{i=1}^{N} f(x_i) w(x_i)$$

Since the set of integration is over the surface of the unit sphere, the sample points need to be uniformly distributed over the unit sphere. Conventionally, the sample points can be distributed on an n×n square grid, jittered, and mapped into spherical coordinates, by using the following equation:

$$\theta = 2\cos^{-1}(\sqrt{1-x})$$

$$\phi = 2\pi y$$

As a result, the weighting function is constant and is the value of the surface of the unit sphere (i.e., $4\pi$):

$$\int f(x)dx \approx \frac{1}{N} \sum_{i=1}^{N} f(x_i) w(x_i) \approx \frac{4\pi}{N} \sum_{i=1}^{N} f(x_i)$$

The SH coefficients can then be calculated as a simple sum of the product of the function to project and the spherical harmonic basis function evaluated at sample points:

$$c_i = \frac{4\pi}{N} \sum_{j=1}^{N} f(x_j) y_j(x_j)$$

The following summarizes the basic steps to calculate SH coefficients at a given vertex of an object to be rendered:
1. Construct a set of n×n samples over the unit sphere around the vertex.
2. Loop through all these samples to calculate each SH coefficient by evaluating the product of the function and the corresponding SH basis functions.
3. Obtain an expression of the function as a set of SH coefficients at the end of the process.

Rendering Equation

In computer graphics, a rendering equation can describe the complete distribution of light in a scene and has been used to implement all sorts of global illumination approaches. The common formulation of the rendering equation without participating media is as follows:

$$L_r(x,\vec{\omega}) = \int_{\Omega} f(x,\vec{\omega}',\vec{\omega}) L_i(x,\vec{\omega}')(\vec{\omega}' \cdot \vec{n}) d\omega'$$

This equation simply says that the outgoing radiance at point x on a surface in the outgoing direction $\omega$ is the sum of the emitted radiance and the radiance reflected from this point in this direction.

The reflectance of the object as a function of illumination geometry and viewing geometry may be represented by a bidirectional reflectance distribution function (BRDF). The BRDF may depend on various parameters, which include but are not limited to, the characteristics of the source light, the structural and optical properties of the surface, the shadow-casting, multiple scattering, mutual shadowing, transmission, reflection, absorption, emission by the surface elements, facet orientation distribution, and facet density. The reflected radiance can be expressed as the integral over the hemisphere of incoming directions at point x of the product of the BRDF and the incident radiance (in other words, the incoming light):

$$L_0(x,\vec{\omega}) = L_e(x,\vec{\omega}) + L_r(x,\vec{\omega})$$

By using differential solid angle, the rendering equation can be rewritten as follows:

$$L_0(x,\vec{\omega}) = L_e(x,\vec{\omega}) + \int_S f_r(x,x' \rightarrow x,\vec{\omega}) L_i(x' \rightarrow x) V(x,x') G(x,x') dA'$$

This equation expresses the reflected radiance as an integral over the set of all points in the scene S of the incident radiance leaving x' toward x and V, the visibility function between the x and x', and G, the geometry term. V is a simple test that returns 1 if x and x' can see each other, or 0 if not. The geometry term depends on the geometric relationship between the surfaces at point x and x'.

In some embodiments, the rendering equation used to calculate the amount of light at different points on the surfaces of the scene can be simplified. For non-limiting examples, the emitted radiance can be taken out if self-emitting objects is not considered. Also, if only Lambertian diffuse lighting—light is equally scattered in any direction, whatever the incident direction—is considered, the BRDF becomes just a constant (the ratio of the reflectance and $\pi$) and can be taken out of the integral:

$$L_0 = \frac{\rho_d}{\pi} \int_s L_i(s)V(s)G(s)ds$$

It becomes clear from the discussion above that the intensity of light leaving a given point on a surface can be expressed as an integral. Such integral, however, cannot be calculated in real time nor in symbolic terms (at least for the time being). The idea behind spherical harmonic lighting is to compute this integral as a preprocessing step and project the different functions on the spherical harmonic basis. Thanks to orthonormality of the spherical harmonics, i.e., $$\int_s y_i(s)y_j(s)ds = \begin{cases} 1, & \text{if: } i = j \\ 0, & \text{if: } i \neq j \end{cases},$$

integrating the product of two band-limited functions, say $f$ and $g$, over the unit sphere $s$ is the same as calculating the dot product of the spherical harmonics coefficients of these functions, i.e., $$\int_s \tilde{f}(s)\tilde{g}(s)ds = \int_s \left[\sum_{i=0}^{n^2} c_i y_i(s) \sum_{i=0}^{n^2} d_i y_i(s)\right]$$

$$ds = \sum_{i=0}^{n^2} c_i d_i \int_s y_i^2(s)ds = \sum_{i=0}^{n^2} c_i d_i$$

In other words, a complex integral of two functions over the unit sphere can be reduced to the simple addition and multiplication of numbers. The equations above will be applied at all vertices to evaluate the rendering equation with the pre-calculated SH coefficients of the different functions involved at run time. Consequently, the preprocessing steps can be decomposed as follows:

1. Project the incoming light onto the SH basis. The incoming light needs to be expressed as a spherical function, either numerically or symbolically.
2. For all points (vertices) of the objects in the scene, project on the SH basis the product of the BRDF, the visibility function, and the geometric term. This product is also referred to as the transfer function, which can be simplified by making some assumptions and taking into account the visibility function and the geometric term.

After both the incoming light and the transfer function are SH projected (SH coefficients pre-computed) using the Monte Carlo integration technique explained above during a preprocessing step, The real-time integral evaluation is then simply performed by computing the dot product of the pre-computed SH coefficients of the transfer function and those of the incoming light at any given vertex of an object or volume.

Scattered Spherical Harmonic Approximation

Figure 2:
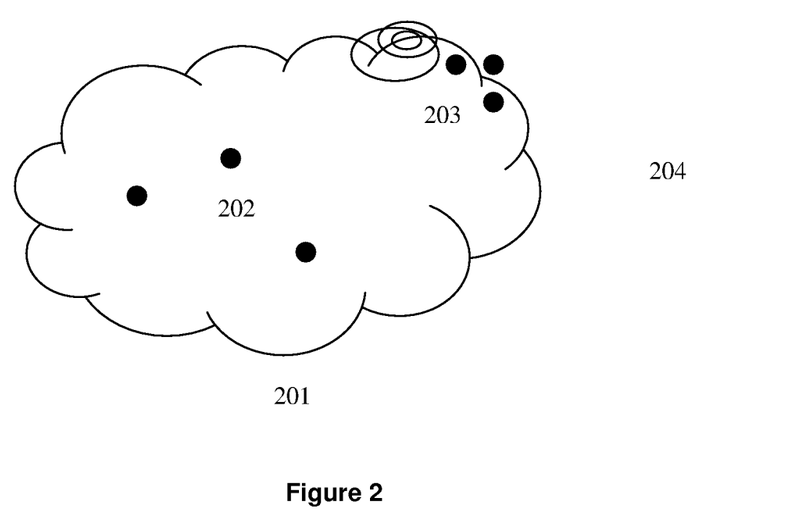
FIG. 2 illustrates exemplary sampling of an object based on density variations.

Rendering the illumination effect on an object (volume) requires a dense set of SH coefficients to be pre-computed at each vertex or grid point of the object based on the process discussed above, which can be expensive both in computation and in storage. In reality, density variation in the interior of a volume, which for non-limiting examples can be a cloud or smoke 201 as shown in FIG. 2, tends to be smooth. Consequently, relatively few SH sampling vertices need to be computed to capture the visibility details in the interior 202 of the volume. On the other hand, the variation is much greater near the edges 203 of the volume, and therefore will require more explicit SH sampling vertices. In addition, it is also not necessary to measure in empty spaces 204 far away from the volume since these regions do not need to be lit. Such varying constraints on sampling vertices suggest the use of a scattered data approximation technique.

In data regression analysis, various kinds of techniques for smooth interpolation of sparse, scattered 3D data can be utilized. For a non-limiting example, least squares, also known as ordinary least squares analysis, is a technique well known to one skilled in the art for linear regression. Least squares approach determines the values of unknown quantities in a statistical model by minimizing the sum of the residuals (difference between the predicted and observed values) squared. The objective consists of adjusting an approximate function y to best fit a known set of data. The data set consist of n data $d(\vec{x}_i)$ at sample points $\vec{x}_i$ with i=1, 2, ..., n. The approximate function has the form of $f(\vec{x}) = \vec{a}p(\vec{x}) = a_0 + a_1 x + a_2 x^2 \ldots a_n x^n$, where $p(\vec{x}) = (1, x, \ldots, x^n)$ is the basis vector for the least-squares polynomials, and $\vec{a} = (a_0, a_1, \ldots, a_n)$ is the vector of the adjustable parameters for basis vector. The goal of least squares fitting is to find the parameter values such that the approximate function best fits the data according to a defined error criterion by minimizing the sum square error function with respect to the adjustable parameters, i.e., $$\min \sum_i \|f(\vec{x}) - d(\vec{x}_i)\|^2.$$

Alternatively, radial basis functions can be utilized in place of least squares to achieve the same goal.

A scattered spherical harmonic approximation method is proposed for SH computation, which sparsely populates (selects from) a volume with a plurality SH sampling vertices and uses least squares approximation to extrapolate and compute the SH coefficients at any (other) arbitrary point of the volume. The objective is to find the coefficients of an n-degree polynomial $f(\vec{x})$ which approximates the values of the SH coefficients computed at sampling vertices of the volume. The minimization problem for each SH coefficient $c_j$ can be stated as:

$$\min \sum_i \|f(\vec{x}) - c_j(\vec{x}_i)\|^2$$

where $\vec{x}_i$ is the location of sampling vertex i, $c_j(\vec{x}_i)$ is computed SH coefficient $c_j$ at $\vec{x}_i$. As well-known to one skilled in the the art, the minimization problem can be solved with the following:

$$\left(\sum_i p(\vec{x}_i)p(\vec{x}_i)^T\right)\vec{a} = \sum_i p(\vec{x}_i)c_j(\vec{x}_i)$$

where $\vec{a}$ is the vector of unknown parameters for the least-squares polynomials. Note that the matrix on left hand side contains only position information, thus using a solution method like LU de-composition permits reuse of factorization result when computing $\vec{a}$ for each SH coefficient.

Figure 3:
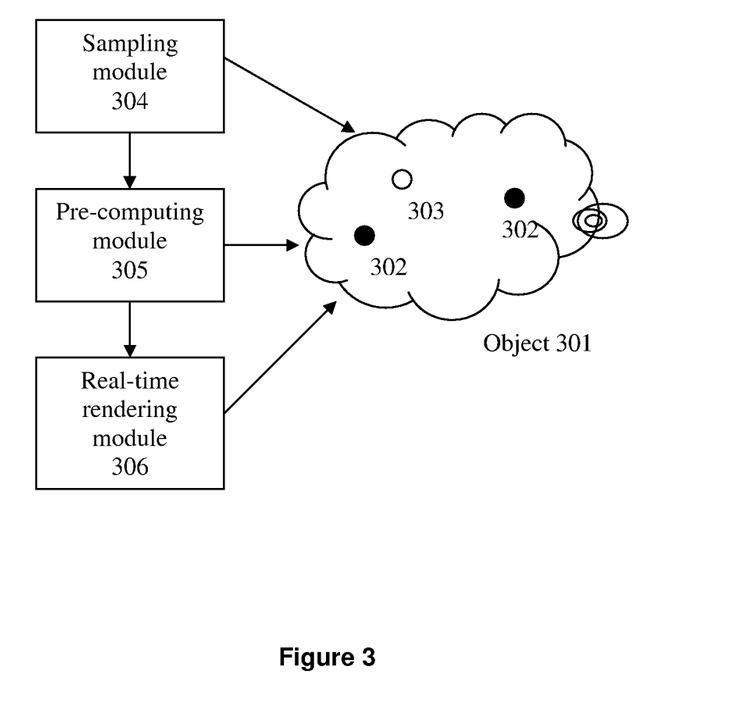
FIG. 3 illustrates an exemplary system to support scattered spherical harmonic approximation in accordance with one embodiment of the present invention.

FIG. 3 illustrates an exemplary system to support scattered spherical harmonic approximation in accordance with one embodiment of the present invention. Although the diagrams depict components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 3, a sampling module 304 selects a plurality of sampling points 302 sparsely populated on an object 301 to be rendered. A pre-computing module 305 calculates a set of SH coefficients for one or more functions used for rendering the object at each of the plurality of sampling points 302 on the object. Here, one or more functions used for rendering the object can be but are not limited to transfer function representing local visibility of the object, and incoming light representing lighting source. The pre-computing module then approximates a set of SH coefficients for the one or more functions at any other point 303 on the object based on the set of SH coefficients at the plurality of sampling points 302. Once SH coefficients of the function at points of the object have been computed, a real-time rendering module 306 renders global illumination effect of the object at run time based on the one or more functions.

Figure 4:
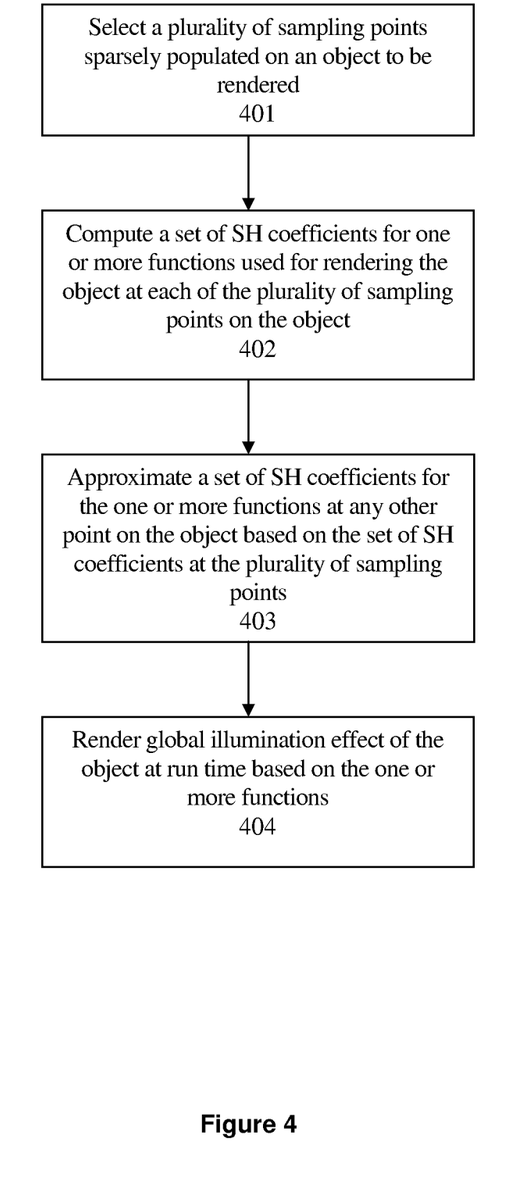
FIG. 4 is a flow chart illustrating an exemplary process to support scattered spherical harmonic approximation in accordance with one embodiment of the present invention.

FIG. 4 is a flow chart illustrating an exemplary process to support scattered spherical harmonic approximation in accordance with one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 4, a plurality of SH sampling points sparsely populated on the object to be rendered can be selected at step 401. At step 402, a set of SH coefficients for one or more functions used for rendering the object can be computed at each of the plurality of sampling points on the object. A set of SH coefficients for the one or more functions can then be approximated at any other point on the object based on the set of SH coefficients at the plurality of sampling points at step 403. At step 404, global illumination effect of the object can be rendered at run time based on the one or more functions.

In some embodiments, the underlying system used for modeling the volume or object can suggest locations for the sparsely populated SH sampling vertices. For a non-limiting example, if a collection of sphere primitives are used to fill a voxel grid, then SH sampling at the center of each sphere can encode the visibility in the local region. For the general case, sampling vertices can be distributed on a coarse isosurface around the density variation of the volume. A subset of these sampling vertices can be driven inside the surface, and some of them can be placed out-side the surface to suppress oscillations from the fitting polynomial.

Figure 5A:
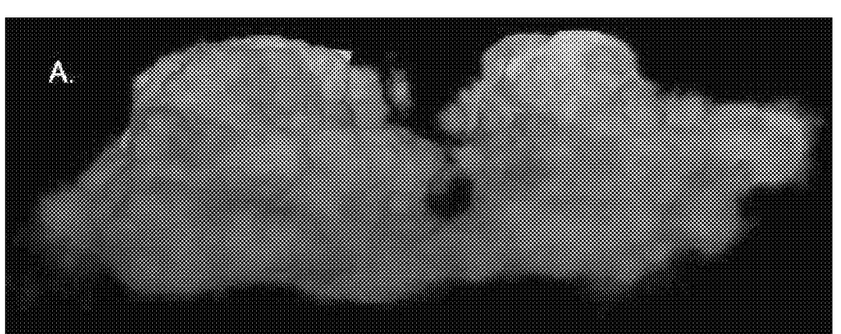
FIGS. 5(a)-(b) illustrate exemplary renderings of a cloud using dense and scattered SH sampling approximation, respectively.
Figure 5B:
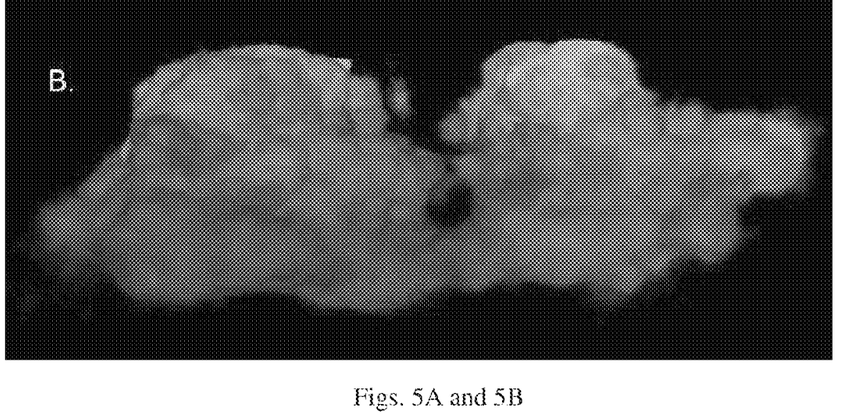

With scattered SH approximation method discussed above, the memory use is not determined by the grid resolution, i.e., the number of points used for rendering the object, but the desired quality of output. For a non-limiting example, the cloud in FIG. 5(a) rendered with dense SH sampling vertices requires 30 MB of storage, and 47 minutes of pre-computation time. In contrast, the cloud in FIG. 5(b) rendered using the scattered SH sampling approximation method requires only 28 KB of storage, and 55 seconds of pre-computation. The cache efficiency gained by repeatedly accessing a relatively small number of floating point numbers leads to a four-fold rendering speedup, when compared to tri-linear interpolation with a naive grid data structure. Experimental results demonstrate that the qualitative difference in the rendered images using conventional SH sampling and the scattered SH approximation method discussed above is minimal. The approximation method successfully captures the subtle environmental lighting qualities present when rendering with computed spherical harmonics.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept of "module" is used in the embodiments of the systems and methods described above, it will be evident that such concept can be interchangeably used with equivalent concepts such as, class, method, type, interface, bean, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support scattered spherical harmonic (SH) approximation, comprising:
   a sampling module operable to select an initial subset of sampling points related to an object to be rendered from a substantially uniform distribution of sampling points, the initial subset of sampling points selected based at least partly on density variations of a volume, the initial subset of sampling points varying in density, further wherein a first subset of the initial subset of sampling points is selected at least partly to be inside a surface of the object and a second subset of the initial subset of sampling points is selected at least partly to be over the surface of the object such that a combination of the first subset and the second subset substantially suppresses oscillations from a fitting polynomial associated with the sampling module;
   a pre-computing module operable to:
      compute, at each of the initial subset of sampling points, a set of SH coefficients for each of one or more functions used for rendering the object, wherein SH coefficients are not computed at the non-selected sampling points; and
      approximate, based on the set of SH coefficients at the initial subset of sampling points, a set of SH coefficients for each of the one or more functions at any other point; and
   a real-time rendering module operable to render global illumination effect of the object at run time based on the one or more functions.

2. The system of claim 1, wherein:
   the sampling module is operable to select few of the initial subset of sampling points where the density variations are smooth.

3. The system of claim 1, wherein:
   the sampling module is operable to select many of the initial subset of sampling points where the density variations are great.

4. The system of claim 1, wherein:
   the sampling module is operable to select none of the initial subset of sampling points in a region far away from the object.

5. The system of claim 1, wherein:
   the one or more functions include a transfer function representing local visibility of the object and an incoming light function representing a lighting source.

6. The system of claim 1, wherein:
   The lighting source is a high frequency lighting source.

7. The system of claim 1, wherein:
   the pre-computing module is operable to compute and/or approximate the set of SH coefficients for one or more functions before rendering the object.

8. The system of claim 1, wherein:
   the pre-computing module is operable to compute the set of SH coefficients for the one or more functions at each of the initial subset of sampling points via Monte Carlo integration technique.

9. The system of claim 1, wherein:
   the pre-computing module is operable to approximate the set of SH coefficients for the one or more functions at any other point via least squares analysis.

10. The system of claim 9, wherein:
    the pre-computing module is operable to approximate the set of SH coefficients for the one or more functions at any other point via nth-order polynomial approximation.

11. The system of claim 1, wherein:
    a real-time rendering module is further operable to render the object at run time by computing the dot product of the SH coefficients of the one or more functions.

12. The system of claim 1, wherein:
    the global illumination effect takes into account subtle effects through different types of diffuse lighting models, which include any of un-shadowed, shadowed, and inter-reflected.

13. A method to support scattered spherical harmonic (SH) approximation, comprising:
    selecting, using a sampling module, an initial subset of sampling points related to an object to be rendered from a substantially uniform distribution of sampling points, the initial subset of sampling points selected based at least partly on density variations of a volume;
    the initial subset of sampling points varying in density, the density variations of the initial subset of sampling points corresponding to the density variations of the volume,
    further wherein a first subset of the initial subset of sampling points is selected at least partly to be inside a surface of the object and a second subset of the initial subset of sampling points is selected at least partly to be over the surface of the object such that a combination of the first subset and the second subset substantially suppresses oscillations from a fitting polynomial associated with the sampling module;
    using a pre-computing module to:
       compute, at each of the initial subset of sampling points, a set of SH coefficients for each of one or more functions used for rendering the object, wherein SH coefficients are not computed at the non-selected sampling points; and
       approximate, based on the set of SH coefficients at the initial subset of sampling points, a set of SH coefficients for each of the one or more functions at any other point;
    rendering global illumination effect of the object at run time based on the one or more functions.

14. The method of claim 13, further comprising: selecting few of the initial subset of sampling points where the density variations are smooth.

15. The method of claim 13, further comprising: selecting many of the initial subset of sampling points where the density variations are great.

16. The method of claim 13, further comprising: selecting none of the initial subset of sampling points in a region far away from the object.

17. The method of claim 13, further comprising:
    computing and/or approximating the set of SH coefficients for one or more functions before rendering the object.

18. The method of claim 13, further comprising:
    computing the set of SH coefficients for the one or more functions at each of the initial subset of sampling points of the object via Monte Carlo integration technique.

19. The method of claim 13, further comprising:
    approximating the set of SH coefficients for the one or more functions at any other point via least squares analysis.

20. The method of claim 19, further comprising:
approximating the set of SH coefficients for the one or more functions at any other point via nth-order polynomial approximation.

21. A non-transitory computer-readable data storage medium having instructions stored thereon that when executed cause a system to:
select, using a sampling module, an initial subset of sampling points related to an object to be rendered from a substantially uniform distribution of sampling points,
the initial subset of sampling points selected based at least partly on density variations of a volume,
the initial subset of sampling points varying in density,
further wherein a first subset of the initial subset of sampling points is selected at least partly to be inside a surface of the object and a second subset of the initial subset of sampling points is selected at least partly to be over the surface of the object such that a combination of the first subset and the second subset substantially suppresses oscillations from a fitting polynomial associated with the sampling module;
use a pre-computing module to:
compute, at each of the initial subset of sampling points, a set of SH coefficients for each of one or more functions used for rendering the object, wherein SH coefficients are not computed at the non-selected sampling points; and
approximate, based on the set of SH coefficients at the initial subset of sampling points, a set of SH coefficients for each of the one or more functions at any other point; and
render global illumination effect of the object at run time based on the one or more functions.

22. A system to support scattered spherical harmonic (SH) approximation, comprising:
a sampling module operable to select a subset of sampling points from a substantially uniform distribution of sampling points related to an object to be rendered, the selected subset of sampling points not being uniform, wherein the sampling points in a lower density variation first volume are selected with lower frequency and the sampling points in a higher density variation second volume are selected with higher frequency;
a pre-computing module operable to:
compute, at each of the subset of sampling points, a set of SH coefficients for each of one or more functions used for rendering the object, wherein SH coefficients are not computed at the non-selected sampling points; and
approximate, at any other point and based on the set of SH coefficients at the subset of sampling points, a set of SH coefficients for each of the one or more functions; and
a real-time rendering module operable to render global illumination effect of the object at run time based on the one or more functions.

23. A system to support scattered spherical harmonic (SH) approximation, comprising:
a sampling module operable to select a subset of grid points from a substantially uniform distribution of grid points in a scene to be rendered, wherein the grid points in a lower density variation first region of the scene are selected with lower frequency and the grid points in a higher density variation second region of the scene are selected with higher frequency;
a pre-compute module operable to:
compute a set of SH coefficients at the selected grid points for a function used for rendering the object, wherein SH coefficients are not computed at the non-selected grid points; and
approximate a set of SH coefficients for the function at any other point and based on the pre-computed SH coefficients at the selected grid points; and
a real-time rendering module operable to render global illumination effect of the object at run time based on the function.

24. The system of claim 23, wherein the selected grid points form a sparse, scattered 3D data set, wherein the pre-compute module uses least squares analysis to approximate the set of SH coefficients for the function at the any other point.

* * * * *